July 9, 1957 J. R. R. HARTER 2,798,901
DARK-TRACE CATHODE RAY TUBE PRESENTATION SYSTEMS
Filed March 12, 1954 3 Sheets-Sheet 2

INVENTOR.
JAMES R. R. HARTER

2,798,901
Patented July 9, 1957

2,798,901

DARK-TRACE CATHODE RAY TUBE PRESENTATION SYSTEMS

James R. R. Harter, Washington, D. C.

Application March 12, 1954, Serial No. 415,938

11 Claims. (Cl. 178—6.8)

(Granted under Title 35, U. S. Code (1952), sec. 266)

The invention described herein may be manufactured and used by or for the Government of the United States of America for governmental purposes without the payment of any royalty thereon or therefor.

It is often desired to make use of data images placed upon cathode ray tubes at a slow frame or repetition rate. Cathode ray tubes having long decay light emitting phosphors, commonly used in such systems, suffer a loss of detail proportional to the length of the cycle and in general have low intrinsic brilliance. The visual presentation obtained from systems using these tubes, therefore, is not satisfactory.

A known type of cathode ray tube, intended for operation in direct visual systems, is capable of long time storage without the loss of detail. This type, known as the dark trace tube, is not of the light emitting type but functions by the formation of light traps on a screen normally reflecting all wavelengths of incident light.

The present systems relate to data storage and reproducing systems, and more particularly to systems using an electronic storage tube of the long persistence or dark trace type. These tubes consist, essentially of a conventional cathode ray tube structure having the inner surface of the tube coated with a potassium chloride compound in crystalline form. The potassium chloride coating in its normal state has a relatively high and uniform reflection coefficient for the entire spectrum of visible light and the external face of the tube therefore appears generally white under normal broad band illumination such as daylight or light from incandescent or fluorescent lamps.

The crystalline coating, when subjected to bombardment by a relatively high velocity electron stream, exhibits a readily apparent darkening of the external face of the tube. This phenomenon is the result of a change in the energy level of the nuclei of the atoms of the screen so bombarded. This shift in energy level causes a change in the reflective characteristics of the bombarded portions of the screen. The portions raised to a higher energy level form a monochromatic light trap or "color center" which will absorb nearly all of the incident green light. The human eye is highly sensitive to green light and the light trap portions of the screen consequently appear to have a dark purplish red color due to the subtraction of the green from the total spectrum of light reflected therefrom.

Images produced on the storage tube face in the above manner have a degree of contrast dependent upon the amount of energy imparted to the potassium chloride layer from the electron beam. The contrast ratio may therefore be increased by increasing the time of bombardment, the acceleration of the electron beam or the current density of the beam to form more effective light trap areas. The energy levels of the nuclei in the screen material may be increased in this manner until contrast ratios of the order of 5 or 6 to 1 are obtained.

Images produced on a dark trace or long persistence tube are relatively permanent and once produced upon the screen will remain there until the nuclei therein are restored to their original energy levels. The image may be erased by the application of heat or light energy to the screen which will restore the monochromatic light traps to their original uniform reflective properties. As the original degree of contrast produced depends upon the amount of energy applied to the potassium chloride screen, so the amount of heat or light energy required to erase the image from the screen depends upon the degree of contrast of the image to be erased. A dense image requires the application of a greater amount of erase energy than a weak image of relatively low contrast.

Many applications involving the use of dark trace tubes follow a general procedure which consists of developing an image on the face of the tube in accordance with information data, utilizing the image so produced, erasing the image, producing a second image and so on. It becomes apparent that the permissible speed of operation of such systems is limited by the erase time requirement. Attempts have been made to solve the erase time problem which becomes a critical one in applications such as radar, teleautograph or other systems requiring relatively high operating speeds. Special tubes have been developed employing a special low mass support for the screen surface mounted inside the tube envelope which may be erased by the heat generated by a high intensity beam from a cathode ray tube gun. Other special tubes have been built with a grid-like heating filament adjacent the sensitized screen to apply heat thereto by external energization. In both cases images of normal contrast can be erased at a faster rate than with conventional tube structure but the requirement for special tubes is a distinct disadvantage.

As has been pointed out above the amount of erase energy required is determined by the contrast of the image to be removed from the screen. Thus, a system capable of operation with a very low degree of contrast on the screen will have a correspondingly low erase energy requirement. Systems capable of operation in this manner are disclosed herein and such systems operate at greatly enhanced speeds with conventional long persistence or dark trace tubes. The increased speed is obtained while using simple erase energy application means and is due to the low erase energy requirement of the low contrast operating characteristics of the improved systems.

The systems herein disclosed possess a further advantage in that the electrical data may be converted to data of another form in the operation of the system. Incoming data in polar coordinate form may be converted to data of rectangular coordinate form, for example, if desired. A low contrast image may be produced upon the dark trace tube by data in any desired form. The data represented by the image may then be removed in the same or any other form desired.

It is an object of the present invention to provide electronic storage tube systems capable of high speed operation.

Another object of the invention is to provide a system capable of converting inherently low contrast images to high contrast images suitable for direct viewing or daylight display purposes.

It is a further object of the invention to provide dark trace or long persistence tube systems capable of operation with a low degree of contrast and low erase energy requirements.

It is a still further object of the invention to provide dark trace tube systems in which the data may be received and utilized in its incoming form or converted to a more suitable data system.

It is an object of the present invention to provide systems capable of transmission of a relatively large amount of graphic or pictorial data in a given length of time and to convert such data to the desired form for visual presentation.

It is a further object of the invention to provide a storage and conversion system for communication systems of the type using data in graphic or pictorial form such as radar, facsimile or Teletype apparatus.

It is still a further object of the invention to provide facsimile or reproduction apparatus capable of high speed operation.

Other objects and many of the attendant advantages of this invention will be readily appreciated as the same becomes better understood by reference to the following detailed description when considered in connection with the accompanying drawings wherein:

Figure 1 is a diagram in schematic form of an embodiment of the invention as applied to a polar coordinate radar search data presentation system or P. P. I.

The system herein disclosed uses a dark trace cathode ray tube utilized for data representation and by illumination of the face thereof with external light and scanning the same with a second cathode ray tube acts to electrically transfer the data represented through a photo cell to a third cathode ray tube, for usual inspection. A mechanically actuated switch triggers a flash lamp to erase the dark trace.

Figure 1:
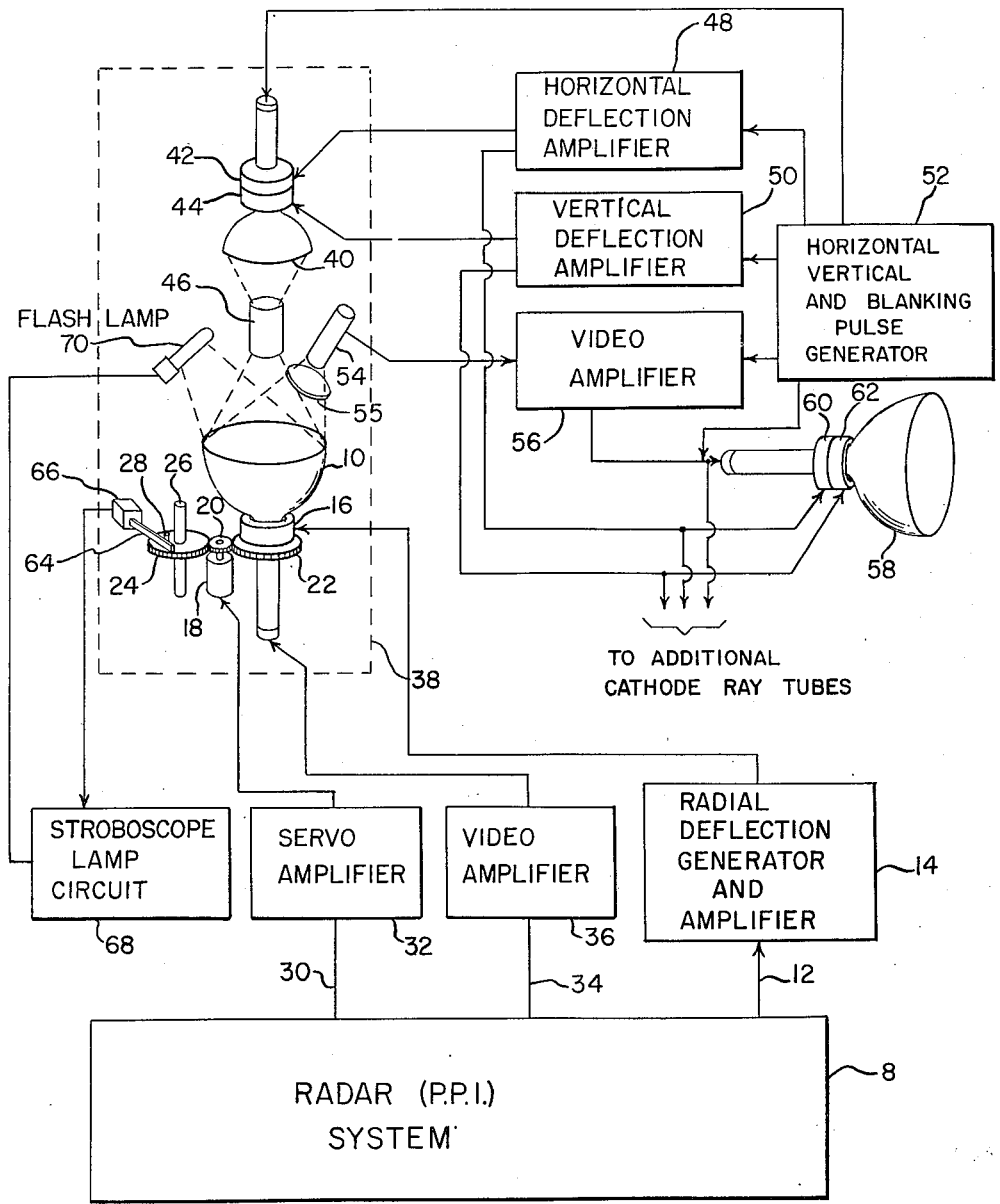

A system according to the present invention has been shown in Figure 1 as applied to a radar data presentation system. This radar system is used only by of example to describe the operation of the system and it will be readily apparent that the invention is not limited to such systems. The radar system illustrates a long cycle data storage problem typical of those to which the present invention applies.

In the system of Figure 1 a conventional radar system of the plan-position-indicator type is schematically shown at 8. The radar system uses a dark trace or long persistence tube 10 as an indicator. This tube may, for example, be of the type designated by the number NU 2112 B or C. The dark trace indicator tube 10 is controlled by the radar system 8. Trigger pulses coinciding with the instant of starting a transmission of a pulse by the radar system 8 are fed through a control channel 12 to a radial deflection generator and amplifier 14 which may be a sawtooth generator of a known type. The output of the radial deflection generator 14 is applied to a deflection yoke 16 of the dark trace indicator tube 10. The deflection yoke 16 is mounted for mechanical rotation about the neck of the tube 10 and is adapted to be driven by a servomotor 18 through the medium of gears indicated at 20 and 22. A further gear 24 is mounted on a shaft 26 and is also driven by the servomotor 18. The gear 24 bears a cam stud 28 on its face the purpose of which will be hereinafter made apparent.

The servomotor 18 is controlled from the radar system 8 through a control channel 30 and a servo amplifier 32. As is usual in radar systems of the P. P. I. type the servomotor 18 serves to drive the deflection yoke 16 in synchronism with the rotation of a scanning antenna (not shown) of the radar system.

The video output of radar system 8, derived from the received reflected pulses is applied through a control channel 34 and a video amplifier 36 to the control grid circuit of the dark trace tube 10. The signal output of the video amplifier 36 thus serves to intensity modulate the electron beam of the dark trace tube 10. The convention circuitry and elements common in cathode ray tube data presentation systems such as focusing and acceleration elements, heater and high potential supply sources have been omitted in order to simplify the drawing as they form no part of the present invention. The system thus far described is capable of developing a typical data presentation in polar coordinate form on the face of tube 10, such as is usually associated with radar systems of the P. P. I. type.

If the above described system were to be used to reproduce an image visible to the human eye under normal illumination a high degree of contrast on the face of the tube would be required. This in turn leads to a difficult problem in supplying erase energy to the sensitive material of the tube face since the erase energy requirement increases with the degree of contrast produced. The arrangement now to be described enables an image placed on the face of the tube with a very low degree of contrast to be reproduced as a visual indication.

The dark trace tube 10 is placed in a light proof enclosure 38 indicated by the dotted lines on the drawing. The face of the tube has a data representation impressed thereon which, as previously explained, is composed of green light traps or color centers where the material of the screen has been subjected to bombardment and areas reflecting all colors of light where the bombardment has been insufficient to change the energy level of the screen. This data representation, if illuminated with light from a source composed substantially wholly of green light, will present a strong contrast between the amount of light reflected from green light trap areas and reflecting areas. A light source rich in green light and hence meeting the requirements is included within the enclosure 38 in the form of a cathode ray tube 40. The cathode ray tube 40 is equipped with a horizontal deflection yoke 42 and a vertical deflection yoke 44. Light produced in the form of a spot on the face of the tube 40 is projected by a lens system indicated at 46 on to the face of the dark trace tube 10. The light spot is caused to scan the face of the tube 10 by means of deflection yokes 42 and 44 which are supplied respectively from a horizontal deflection amplifier 48 and a vertical deflection amplifier 50. These amplifiers in turn are fed from a pulse generator unit 52 which produces sawtooth voltages for horizontal and vertical deflection purposes and the proper blanking pulses for application to the grid of tube 40. The light spot produced on tube 40 moves over its face in a conventional raster pattern and, as projected by the lens system 46, scans the face of tube 10 with a motion in a rectilinear pattern. The light supplying system, then, is of the flying spot scanner type.

As the light spot scans the face of the dark trace tube 10 greater or lesser amounts of the green light will be reflected from the face of the tube depending on the recorded image. The reflected light is picked up by a photocell 54 and converted to an electrical signal. The photocell 54 is provided with optical transmission filters indicated at 55 which provide maximum transmission of the light wavelengths that are most highly absorbed by the screen of the dark trace tube. The action of the filter is such as to cause the photocell to generate a signal in response to substantially monochromatic light scanning of the dark trace tube. This electrical signal is amplified in a video amplifier 56, mixed with the blanking pulses from the pulse generator unit 52 and applied to the control grid circuit of a cathode ray tube 58 to intensity modulate the electron beam thereof. The cathode ray tube 58 may be any of the standard television types of high intensity direct view or projection tubes. The modulated electron beam of tube 58 is deflected by a horizontal deflection yoke 60 and a vertical deflection yoke 62. These yokes are fed respectively from the horizontal deflection amplifier 48 and the vertical deflection amplifier 50. As a result the beam of tube 58 is scanned through a raster similar to that of the flying spot scanner and, as it is intensity modulated by the photocell output responsive to reflected light from the face of tube 10, a visual reproduction of the stored data on the face of tube 10 appears on the face of tube 58.

In the radar system as disclosed it is apparent that the dark trace tube 10 must have the image produced on its screen erased once during each circular sweep. The cam stud 26 on the gear 26 engages an arm 64 to operate a switch 66 once during each circular sweep. The operation of switch 64 triggers the stroboscope lamp circuit 68 to cause the flashing of a flash lamp 70 placed within the light-proof enclosure 58 in such a position that the light therefrom falls upon the face of the dark trace tube 10. The intense light from the flash lamp 70 applies sufficient energy to the potassium chloride screen of tube 10 to erase the low contrast image which has been applied thereto.

Figure 2:
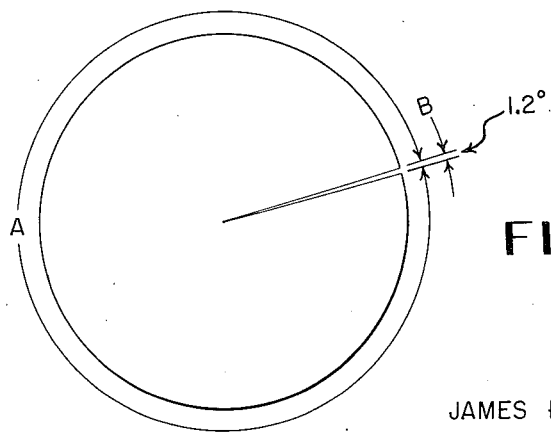
Fig. 2 is an explanatory diagram showing the relative periods of the writing and erase energy application to a dark trace tube used in the system of Figure 1.

Figure 2 is a diagram illustrating the relative length of the write and erase periods required for the long persistence tube 10 of Figure 1. The large A sector illustrates the portion of the angular sweep time of tube 10 during which information is recorded on the face of the tube. The small B sector represents the portion of the angular sweep time necessary for operation of the erase apparatus. It will be apparent that no information can be derived during the portion of the sweep time required for erasing purposes. It is apparent, however, that the small erase sector is but a small portion of the total coverage of the radar system. Due to the low contrast used the time required for erasure of the image is of the order of 0.01 second. This time interval in a 20 R. P. M. radar system results in a blind spot which is a 1.2° sector of the total 360° as shown in Figure 2. If a 10 R. P. M. radar system is used the blind spot may be reduced to 0.6° of the total tube face. The cam may be adjusted to cause the blind spot or erase sector to occur at any desired location in the total sweep. The lost coverage is not sufficient to constitute a disadvantage in a practical system and may be timed to occur at a non-critical sector of the total scan. If all sectors must be scanned the tooth ratio of gears 22 and 24 may be chosen at a value which is not unity so as to cause the erase flash to occur, for example, only after a full 360° sweep so that the erase sector is sequentially stepped around the total covered area, occurring at a different area with each successive sweep.

As indicated in Figure 1 additional leads may be brought out from the various inputs to cathode ray tube 58. These leads may supply one or more additional cathode ray tubes of the same type as tube 58. The data may thus be viewed at a plurality of locations if desired.

Figure 3:
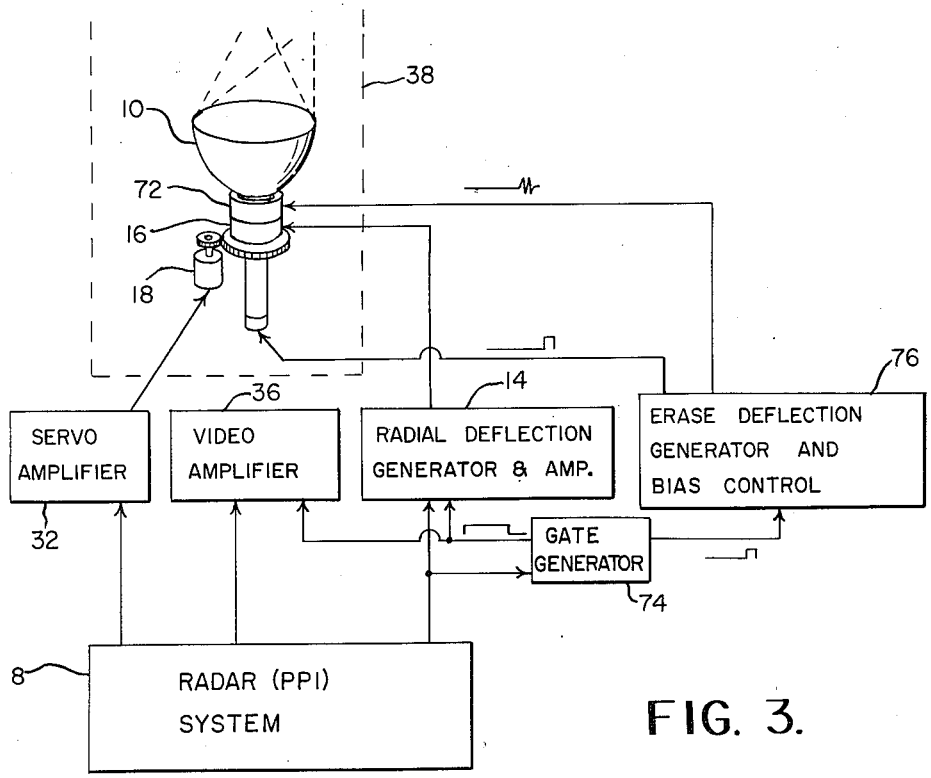
Figure 3 is a schematic representation of another form of erase apparatus usable in the overall system of Figure 1.

Another modification of an erase system suitable for use with a dark trace or long persistence tube is shown in Figure 3 of the drawings. This figure is a schematic view of apparatus usable in a modification of the overall organization shown by Figure 1.

The lower portion of the light proof enclosure is shown in Figure 3 and the dark trace tube is mounted therein as in the case of Figure 1. It is to be understood that the upper portion of the light enclosure containing the photocell pickup, flying spot scanner cathode ray tube and lens system are the same for this modification as those of Figure 1. The external circuitry such as the deflection amplifiers 48 and 50, video amplifier 56, pulse generator 52 and the cathode ray projection tube 58 are also the same as illustrated in Figure 1.

The parts of the modification of Figure 3, which are the same as Figure 1, have been designated by the same reference characters. A radar system of the P. P. I. type 8 triggers a radial deflection generator and amplifier 14 and the output of element 14 is applied to a deflection yoke 16 as in Figure 1. The yoke 16 is rotated by a servomotor 18 which is fed from the radar system 8 through servo amplifier 32. Video amplifier 36 supplies the radar data to the grid of dark trace tube 10 to intensity modulate the electron beam thereof.

It will be noted that the stroboscopic erase means of Figure 1 is not included in Figure 3. In this modification of the apparatus the screen of the dark trace tube is erased by means of a high intensity electron stream from the gun of the dark trace tube and the apparatus necessary for such erasure will now be described.

Figure 4:
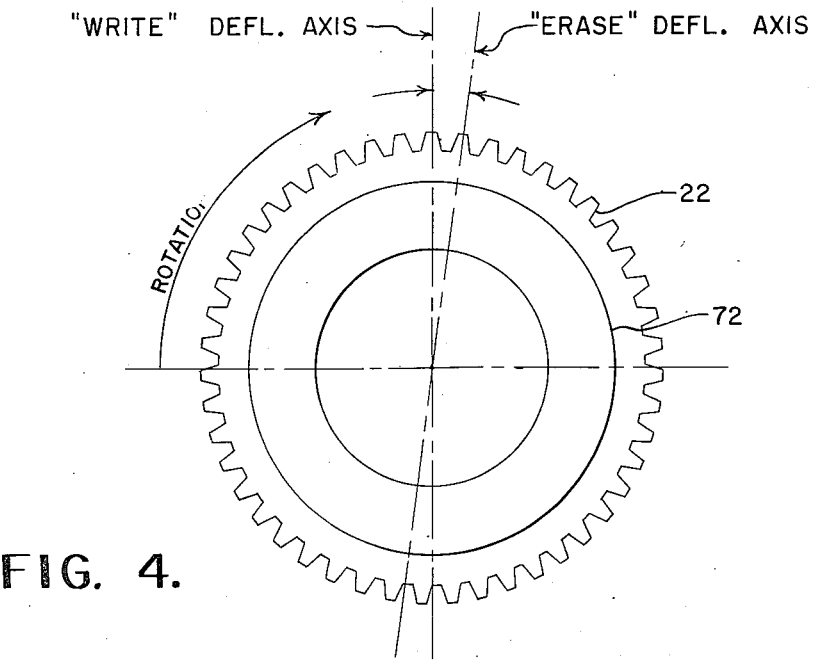
Figure 4 is a detail view of the deflection yokes used in the apparatus used in Figure 3 indicating the relative positioning of these yokes.

Tube 10 in this modification is equipped with a second deflection yoke 72 which is driven as is yoke 16 by the servomotor 18. The deflection axis of yoke 72 is displaced from the axis of yoke 16 in a leading direction with respect to the direction of rotation of both yokes. This relative displacement of the yoke deflection axis is shown schematically in Figure 4. The line A—A indicates the deflection axis of the yoke 16 and the line B—B indicates the deflection axis of the yoke 72. Yoke 72 is the deflection yoke for the "erase" beam, while yoke 16 is the conventional deflection yoke for the "write" beam as in the modification of Figure 1.

A gate generator 74 which may be a conventional multivibrator circuit, is connected to the video output of radar system 8 to be triggered by the pulses indicative of the beginning of each transmitted pulse. The output of the gate generator is connected to the amplifier section of the radial deflection and amplifier 14, to the video amplifier 36 and to the erase deflection generator and bias control 76. The bias control portion of element 76 may be any of the well known D. C. level control circuits known to the prior art. Similarly the radial deflection voltage generator portion of element 76 may be a conventional triggered relaxation oscillator which is set in operation by the application of the positive gate voltage thereto. The details of these well-known circuits form no part of my invention and have not been shown.

Figure 5:
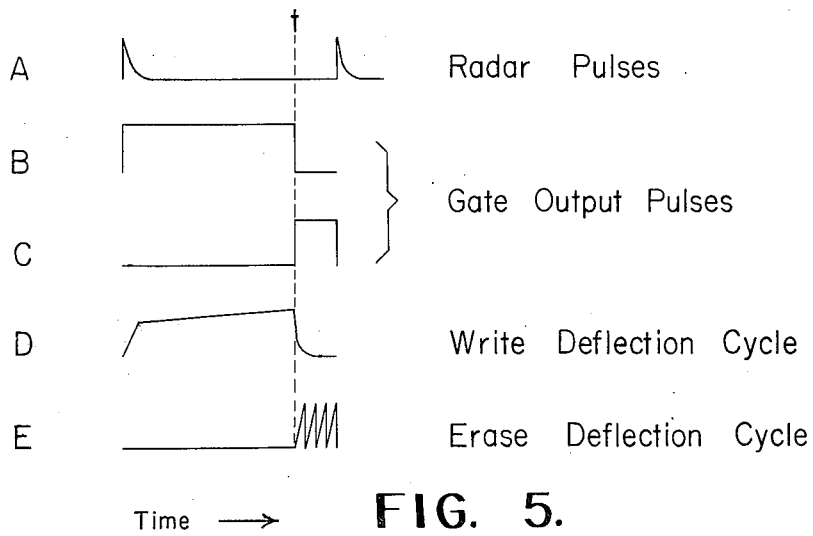
Figure 5 is an explanatory diagram showing the waveforms of voltages at various points in the apparatus of Figure 3.

The waveforms of the various system voltages are shown in Figure 5 in their proper phase relationship to one another. The leading edge of the radar pulses A trigger the gate circuit 74 which produces two output waveforms illustrated at B and C. Pulse B represents the "write" gate pulse which is applied to circuit elements 14 and 36 to render them operative. Pulse C is the erase gate pulse which is applied to circuit element 76. The output of radial deflection generator and amplifier 14 is shown at D and the output of the "erase" deflection generator 76 is shown at E. These waveforms have been also shown in miniature scale applied to the leads of the schematic diagram of Figure 3.

The operation of the circuit of Figure 3 will now be explained. At the start of a transmitted radar pulse positive gate voltages are applied to the video amplifier 36 and the radial deflection generator and amplifier 14. Video signals from the radar system 8 will now cause an image to be "written" on a sector of the screen of tube 10. At the end of time T (Figure 5) the "writing" circuit elements 14 and 36 are disabled by their gate voltages and the erase deflection generator and bias control element 76 becomes operative by the application of a positive gate voltage thereto. The bias control section of element 76 applies a relatively higher positive voltage to the grid of the long persistence cathode ray tube 10 to increase the intensity of the electron beam thereof. Simultaneously the erase deflection voltage shown at E (Figure 5) is applied to yoke 72 by the erase deflection generator section of element 76. It will be remembered that the deflection axis of yoke 72 is displaced in a leading direction from the axis of yoke 16. The sector of tube 10 upon which data has just been recorded is undisturbed. The screen sector just ahead of this in the direction of rotation of the yokes is now swept by an intense cathode ray beam which generates sufficient heat in the screen to erase any images stored thereon previously. At the end of the erase period the "write" apparatus is now energized to record data upon the sector of the screen just "erased" by the intense cathode ray beam. The writing process progresses by sectors around the tube face, images being recorded on sectors which have been just erased in the previous gate cycle. As with the apparatus of Figure 1, the use of a low contrast image permits erasure by low energy requirement means, and the overall speed of operation may be relatively high as compared with that of previously used systems.

The systems as disclosed above make use of a flying spot scanner system wherein the scanning is accomplished in a raster pattern by using an electronically driven cathode ray tube as the scanning light source. It is believed readily apparent that the scanning of the face of the dark trace or long-persistence tube may be accomplished by other means. The scanning could be accomplished by a cathode ray tube light source using any other form of sweep as for example a spiral sweep system. Mechanical scanner systems are also applicable to the system shown. Various combinations such as helically slotted rotating drums used in conjunction with a rotating slotted disc are well known in the art for scanning purposes. Such scanner systems may be interposed between a monochromatic light source and the face of the tube or between the face of the tube and the photocell pickup means whichever is more convenient.

Obviously many modifications and variations of the present invention are possible in the light of the above teachings. It is therefore to be understood that within the scope of the appended claims the invention may be practiced otherwise than as specifically described.

What is claimed is:

1. A data presentation system comprising a dark trace cathode ray tube, means for recording data as an image upon the sensitized face of the cathode ray tube, a flying spot scanner means for said image including a monochromatic light source having a color to which the image on said tube is most sensitive light sensitive means responsive to light reflected from the face of said cathode ray tube to generate a signal, a second cathode ray tube connected to said last named means to reproduce the data and means to periodically erase the image from said dark trace cathode ray tube.

2. A data presentation system which comprises a cathode ray tube, a sensitive screen on the face of said tube which normally has a uniform reflection coefficient for the entire spectrum of visible light but whose reflection characteristic changes in response to energy bombardment, means to sweep an electron beam over the face of said tube, data responsive means to modulate the intensity of said beam, flying spot scanner means including a source of optimum spectral light energy to illuminate the reflective face of said screen, photo electric means primarily responsive to essentially monochromatic light which is the spectral value primarily absorbed by the energy bombarded portions of the said sensitive screen reflected from the face of said tube, means responsive to said photoelectric means to reproduce the reflected light pattern from said screen and means to periodically apply erase energy to said screen to restore its uniform reflection coefficient.

3. A system according to claim 2 wherein said means to apply erase energy to said screen is an electric gaseous discharge lamp and the energy is applied in the form of light.

4. A system according to claim 2 wherein said means to periodically apply energy to said screen is the cathode ray gun of said cathode ray tube and the energy is applied through the electron stream of said tube.

5. A data presentation and conversion system comprising a cathode ray tube having a screen of the dark trace type, a source of electrical data in polar coordinate form, sweep and modulation circuits responsive to said data and connected to said cathode ray tube to produce a data image on the screen thereof, a flying spot scanner means adapted to illuminate the face of said cathode ray tube in a scan pattern of rectangular coordinate form, a photo sensitive pick up means responsive to light reflected from the face of said tube and rectangular coordinate reproduction means responsive to the output of said photocell to reproduce a visual image of the data image appearing on the face of said dark trace cathode ray tube.

6. A data presentation system comprising a first cathode ray tube of the dark trace screen type, deflection yoke means for said tube, radial sweep means for said first cathode ray tube connected to said deflection yoke means, a source of polar coordinate data, means responsive to said polar coordinate data to rotate said yoke means and to intensity modulate the electron beam of said first cathode ray tube to produce a data image on the screen thereof, a second cathode ray tube having a relatively short persistence screen mounted in face to face relationship with and adjacent to said first cathode ray tube, horizontal and vertical sweep means for said second cathode ray tube, photo electric pickup means responsive to reflected light from the face of said first tube, a third cathode ray tube having a medium persistence high contrast image producing screen, means to connect the deflection elements of said third tube to the horizontal and vertical sweep means for said second cathode ray tube, means responsive to output the photoelectric pickup means to intensity modulate the beam of the third cathode ray tube and periodically operated means to apply erase energy to the screen of the first cathode ray tube.

7. A cathode ray tube data presentation system for use with systems having a relatively long data cycle, comprising a first cathode ray data storage tube of the dark trace type, means to develop an image on said tube representative of the data variations over one cycle thereof, a flying spot scanner including a monochromatic spot light source, means to sweep said light source over the data image on said dark trace tube in a predetermined scan pattern, photoelectric means responsive to reflected light from said image, a second cathode ray tube of the high conversion efficiency type and means responsive to the output of said photoelectric means to intensity modulate the electron beam of said second cathode ray tube.

8. A system according to claim 7 having erase energy means operative at the end of each data cycle to erase at least a portion of the image stored on said dark trace tube.

9. A system according to claim 8 wherein said erase energy applying means comprises an electric lamp means to illuminate the screen of said first cathode ray tube.

10. A system according to claim 8 wherein said erase energy applying means comprises means to increase the beam intensity of said first cathode ray tube and sweep means to guide said beam over at least a portion of the screen of said first cathode ray tube.

11. An image presentation system comprising in combination a cathode ray tube having an image producing screen whose reflection characteristic changes in response to energy bombardment, a light supplying system to scan the sensitive screen whereby amounts of light varying in accordance with an image are reflected from the screen, means responsive to the reflected light to generate an electric signal, a second cathode ray tube connected to said last named means to produce a visual reproduction of an image appearing on the first cathode ray tube, and means to erase the image on the said first cathode ray tube.

References Cited in the file of this patent

UNITED STATES PATENTS

| | | |
|---|---|---|
| 2,533,381 | Levy et al. | Dec. 12, 1950 |
| 2,534,610 | Marcy | Dec. 19, 1950 |
| 2,663,012 | Beers | Dec. 15, 1953 |

FOREIGN PATENTS

| | | |
|---|---|---|
| 866,192 | France | Apr. 7, 1941 |